(12) United States Patent
Qiang

(10) Patent No.: US 8,753,051 B2
(45) Date of Patent: Jun. 17, 2014

(54) VALVE ASSEMBLIES FOR A DUNNAGE OR CARGO AIR BAGS, AND RELATED METHODS OF USE

(71) Applicant: Wu Qiang, Shanghai (CH)

(72) Inventor: Wu Qiang, Shanghai (CH)

(*) Notice: Subject to any disclaimer, the term of this patent is extended or adjusted under 35 U.S.C. 154(b) by 0 days.

(21) Appl. No.: 13/626,868

(22) Filed: Sep. 25, 2012

(65) Prior Publication Data

US 2014/0086700 A1    Mar. 27, 2014

(51) Int. Cl.
*B61D 45/00*    (2006.01)
*B65D 85/36*    (2006.01)

(52) U.S. Cl.
USPC .......................................................... 410/119

(58) Field of Classification Search
USPC ............. 410/117–122, 155, 154, 96–99, 125, 410/39, 41; 206/522, 523, 583, 593; 141/10, 68, 114, 313
See application file for complete search history.

(56) References Cited

U.S. PATENT DOCUMENTS

| | | | | |
|---|---|---|---|---|
| 4,073,389 A | * | 2/1978 | Angarola et al. | 410/119 |
| 5,204,146 A | * | 4/1993 | Heinze et al. | 428/7 |
| 6,990,994 B2 | * | 1/2006 | Reeb et al. | 137/223 |
| 7,008,155 B2 | * | 3/2006 | Smith et al. | 410/119 |
| 7,195,029 B2 | * | 3/2007 | Wass | 137/223 |
| 7,434,594 B1 | * | 10/2008 | Robbins et al. | 137/223 |
| 7,980,799 B1 | * | 7/2011 | Rioux et al. | 410/119 |

* cited by examiner

*Primary Examiner* — Glenn Dayoan
*Assistant Examiner* — Sunsurraye Westbrook
(74) *Attorney, Agent, or Firm* — John K. Buche; Buche & Associates, P.C.

(57) ABSTRACT

Generally disclosed is an exemplary dunnage bag valve assembly that may be used to inflate a dunnage bag to capacity or deflate a dunage bag while minimizing the impact of fighting back pressure during deflation. In one embodiment the valve assembly comprises: a tubiform body having a flange disposed therearound; an internal support bar; a flapper coupled to the support bar along the midsection of the flapper, wherein the flapper closes the tubiform of the tubiform body; a lever with a fulcrum on the support bar, wherein operating of the lever on the fulcrum bends or folds the flapper along its midsection for opening the tubiform of the tubiform body during deflation of an air bag.

8 Claims, 2 Drawing Sheets

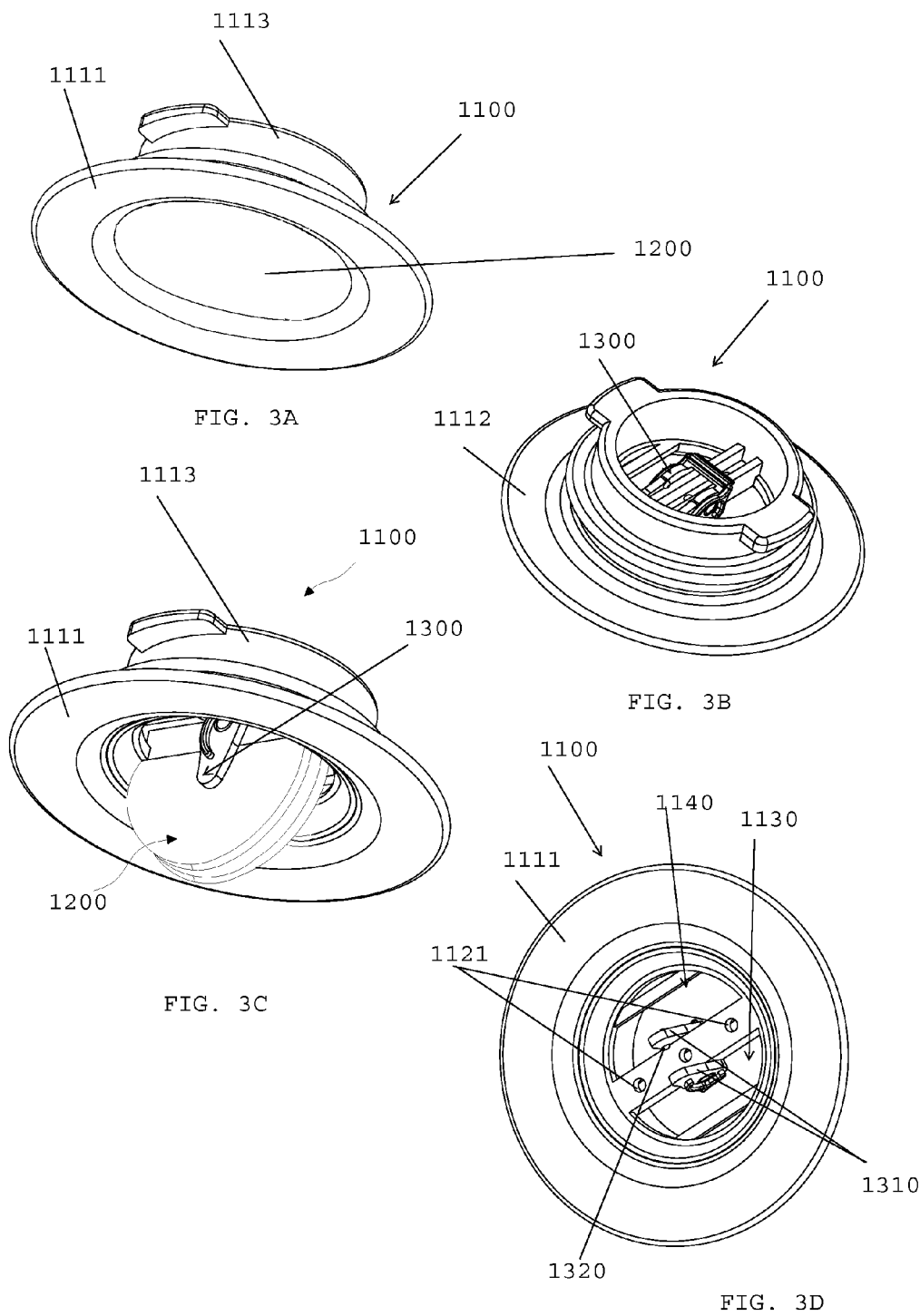

VALVE ASSEMBLIES FOR A DUNNAGE OR CARGO AIR BAGS, AND RELATED METHODS OF USE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present disclosure pertains to the field of dunnage bags. More specifically, the present specification discloses improvements to inflation valve assemblies for dunnage bags and related methods of use.

2. Background of the Invention

Dunnage bags are airbags that are used in the cargo shipment or transportation industry to secure or brace cargo within the holds of a conveyance (e.g., a railroad car, shipping containers, boats or ships, truck trailers, and the like). In most cases, dunnage bags comprise an inflatable bladder with a valve assembly, wherein naturally compressed air, pressurized air, or other gasses may be, via the valve assembly, either (1) conducted to within the bladder for inflation of a deflated bag, (2) retained within the bladder of an inflated bag, or (3) exhausted from the bladder for deflating an inflated bag. In use, deflated dunnage bags are inflated within voids located between either (a) adjacent cargo loads or (b) cargo loads and the walls of a cargo hold whereby cargo loads are secured against undesirable movements during transport by the inflated bags.

In view of the forgoing, dunnage bag valve assemblies are frequently configured to electively: conduct air or other gasses into the bladder; retain the air or gasses within the bladder; and exhaust the air or other gasses from the bladder. Until this disclosure, such configuration has comprised: a tubular valve body defining a hollow space therewith and an annular flange portion, wherein the tubular valve body is adapted for insertion through an aperture in the bladder so that a free distal end of the body projects outward from the bladder to provide fluid communication between the inside and outside of the bladder, and wherein the flange portion is coupled to the rim of the aperture in the bladder in an air-tight manner; and a flapper member pivotally disposed within or adjacent to the hollow space, wherein the flapper member is adapted to close the hollow space when pivoted to a first position and open the hollow space when pivoted to a second position toward the inside of the bladder. See, e.g., FIGS. 2 through 7 of U.S. Pat. No. 6,823,905 (issued Nov. 30, 2004). While capable of being implemented in a dunnage bag, such valve assemblies have not been entirely satisfactory for their intended purposes.

One unsatisfactory aspect of such valve assemblies is that the flapper member of the valve assembly becomes biased to a closed position after partial inflation of the bladder due to back pressure caused by gasses in the bladder. Said bias is unsatisfactory for deflating a bladder in many instances because deflation cannot occur without propping the flapper member with a foreign object. Accordingly, there is a need for dunnage bag air assemblies that can be used to deflate dunnage bags without fighting back pressure and without using a foreign object to prop a flapper member.

SUMMARY OF THE INVENTION

An objective of this specification to disclose an exemplary dunnage bag valve assembly that may be used to deflate a dunnage bag and minimize the impact of fighting back pressure against a flapper member. In one embodiment, the valve assembly comprises: a tubiform body having a flange disposed therearound; an internal support bar; a flapper coupled to the support bar along the midsection of the flapper, wherein the flapper closes the passage of the tubiform body; a lever with a fulcrum on the support bar, wherein operating of the lever on the fulcrum bends or folds the flapper along its midsection for opening the passage of the tubiform body.

BRIEF DESCRIPTION OF THE FIGURES

Other objectives of the disclosure will become apparent to those skilled in the art once the invention has been shown and described. The manner in which these objectives and other desirable characteristics can be obtained is explained in the following description and attached figures in which:

FIG. 3A is bottom perspective view of a partially disassembled dunnage bag valve assembly 1000 of FIG. 1;

FIG. 3B is a top perspective view of a partially disassembled dunnage bag valve assembly of FIG. 1;

FIG. 3C is another bottom perspective view of a partially disassembled dunnage bag valve assembly 1000 of FIG. 1 wherein a flapper is in an open position; and, FIG. 3D is yet another bottom perspective view of a partially disassembled dunnage bag valve assembly 1000 of FIG. 1 wherein a flapper is in an open position.

It is to be noted: the appended figures illustrate only typical embodiments of the dunnage bag valve assemblies contemplated by this disclosure and, therefore, the disclosed embodiments should not to be considered limiting of the scope of possible embodiments for such valve assemblies. That is to say, the spirit and intent of this disclosure may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Generally disclosed is an exemplary dunnage bag valve assembly that may be used to inflate a dunnage bag or deflate a dunage bag without fighting back pressure against a flapper member. In one embodiment, the valve assembly comprises: a tubiform body having a flange disposed therearound; an internal support bar; a flapper coupled to the support bar along the midsection of the flapper, wherein the flapper closes the passage of the tubiform body; a lever with a fulcrum on the support bar, wherein operating of the lever on the fulcrum bends or folds the flapper along its midsection for opening the passage of the tubiform body. The more specific details of the disclosed valve assembly are described with reference to the attached figures.

Figure 1:
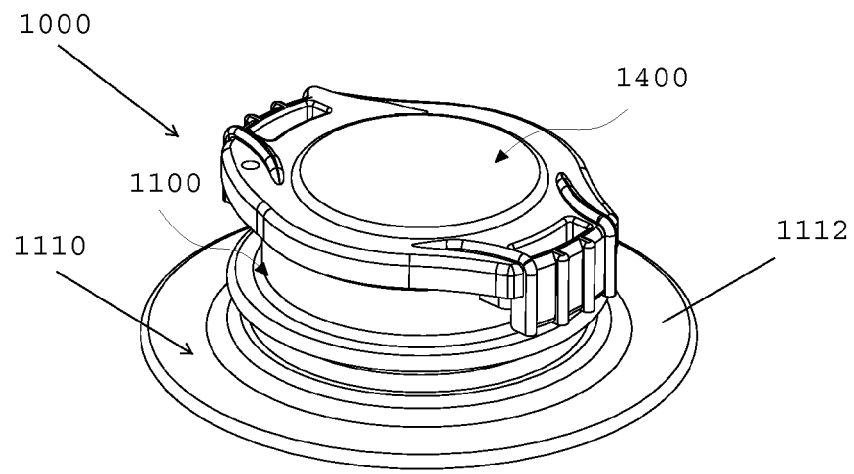
FIG. 1 is a perspective view of a dunnage bag valve assembly 1000.
Figure 2:
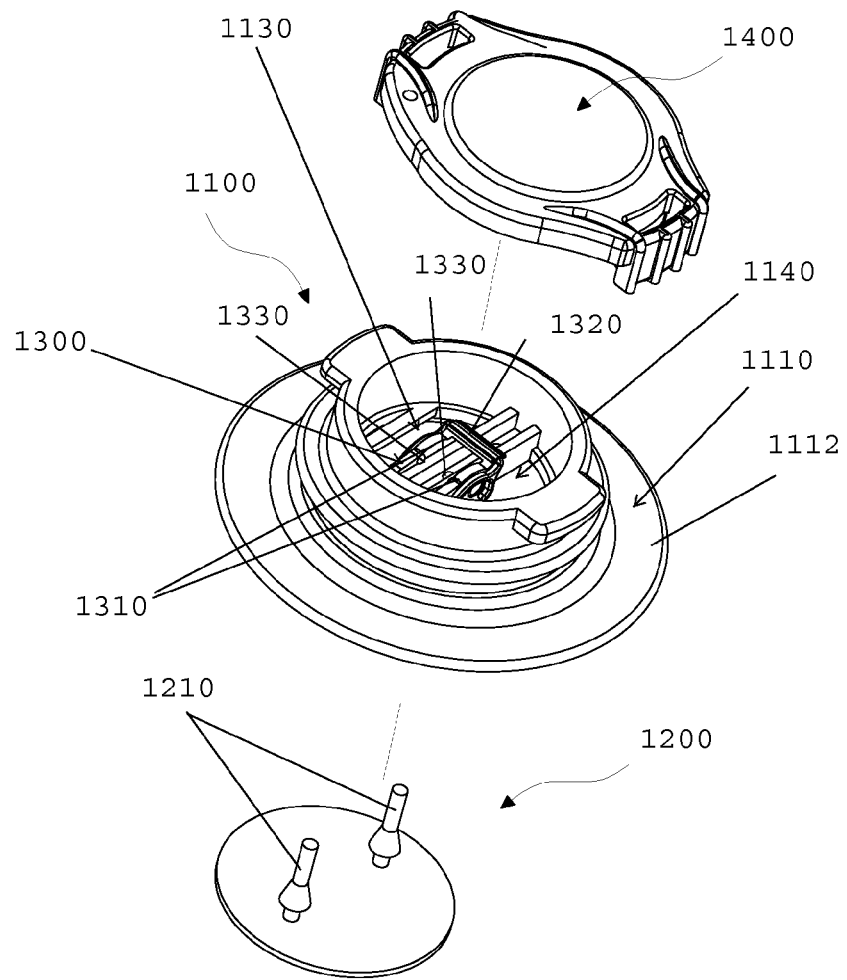
FIG. 2 is an exploded view of the dunnage bag valve assembly 1000 of FIG. 1.

FIG. 1 is a perspective view of a preferred embodiment of an assembled dunnage bag valve assembly 1000. FIG. 2 is an exploded view of the dunnage bag valve assembly 1000 depicted in FIG. 1. FIGS. 3A and 3D are bottom perspectives of a partially disassembled valve assembly depicted in FIG. 1 (e.g., without the cap 30). As seen in the figures, the depicted dunnage bag valve assembly 1000 comprises: a tubiform body 1100; a flapper 1200; a lever 1300; and a cap 1400.

A preferred embodiment of the tubiform body 1100 is depicted in FIGS. 1 through 3A and 3D. Referring particularly to FIG. 2, the illustrative tubiform body 1100 is generally cylindrical with an annular flange member 1110 wherein, for example, the undersurface portion 1111 or oversurface portion 1112 of the annular flange member 1110 is adapted to be heat-sealed respectively to an exterior or interior surface portion of an inflatable bladder (not shown) of a dunnage bag (not shown) so that a socket portion 1113 of the inflation tubular body 1100 is adapted to project outwardly of the inflatable bladder (not shown). In this manner, when a suitable inflation nozzle (not shown), is fluidically connected to the socket portion 1113 of the valve assembly 1000, pressurized air or compressed air can be conducted into the interior of the inflatable bladder so as to inflate the same. Referring now to FIG. 3D, the tubular body 1100 further comprises a support bar 1120 that is, in a preferred embodiment, transverse or perpendicular to the cylindrical shape of the tubiform body 1100 so as to divide the tube into two sides (1130 and 1140) capable of communicating fluids through the tubular body 1100. Preferably, the support bar 1200 features apertures 1121 along its length. As discussed further below, the support bar 1120 is adapted, via apertures 1121, for securing thereto the flapper member 1200 and the lever 1300.

A preferred embodiment of the flapper 1200 is depicted in FIGS. 2 through 3A. As can best be appreciated from FIG. 2, a substantially planar, disc-type flapper 1200, having a substantially circular configuration, has two projections 1210 along a centerline thereof which are adapted to be fixedly secured to an underside of the support bar 1120 via insertion of the projections 1210 through the apertures 1121 of the support bar 1120. When so secured to the support bar 1120 of the tubiform body 1100, the flapper 1200 is positioned to block the both sides 1130, 1140 of the tube of the tubiform body 1100, as shown in FIG. 3A. As discussed further below, the flapper 1200 is configured to bend along the centerline occupied by the projections 1210.

A preferred embodiment of the lever 1300 is depicted in FIGS. 2 and 3D. Referring to those figures, the lever 1300 is defined by two parallel arms 1310, a handle 1320, a fulcrum or axle (not shown) between the two arms 1310, and stopper members 1330. Still referring to the same figures, the lever 1300 is configured to be pivotally mounted to the support bar 1120 of the tubiform body 1100 whereby a fulcrum is established between the handle 1320 and the two arms 1310. In one embodiment, the lever 1300 may operate over the fulcrum from a first position (shown in FIG. 3A), wherein the arms 1310 are parallel to the support bar 1120 and the handle 1320 is in abutment therewith, and a second position (shown in FIG. 3D), wherein the arms 1310 are perpendicular to the support bar 1120 and the handle 1320 is raised relative thereto. Preferably, the lever 1300 features stoppers 1330, which abut the top of the support bar 1120 while the lever 1300 is in said first position whereby the lever 1300 does not operate over the fulcrum unintentionally to arrive at said second position.

A preferred embodiment of the cap 1400 is depicted in FIGS. 1 and 2. As shown in those figures, the cap is generally configured for securement over the socket portion 1113 of the tubular body 1000. Those of skill in the art will appreciate the manner by which such securement may be accomplished. Subject thereto, preferable manners of attachment include, but are not limited to: snap fit (shown in FIG. 2); threaded engagement (not shown); or the like.

In operation, the valve assembly may operate to inflate a dunnage bag to capacity. FIGS. 1 and 3A through 3D illustrate modes of so inflating a dunnage bag. In one embodiment, a deflated dunnage bag (not shown) comprising the valve assembly 1000 (shown in FIG. 1) may be inflated by: (1) removing the cap 1400 (e.g., transitioning from the configuration of the valve assembly 1000 depicted in FIG. 1 to the configuration of the assembly 1000 depicted in FIGS. 3A and 3B); (2) positioning a suitable inflation nozzle (not shown) inside the socket member 1113 of the tubular body so that it is fluidically connected to the socket portion 1113 of the valve assembly 1000; (3) forcing compressed air through the valve assembly 1000 whereby (a) the flapper 1200 bends along a center line under the force of the air and (b) air is communicated into the interior of the inflatable bladder, via the first and second sides 1130, 1140 of the tubiform body 1100 to inflate the bladder to up to full capacity; (4) allowing back pressure from the gasses inside the bladder to unfold the flapper 1200 from its second position to its first position whereby the flapper 1200 bends along a center line so that the first and second sides 1130, 1140 of the tubiform body are blocked thereby the flapper 1200 (transitioning from the configurations of FIGS. 3C and 3D to the configurations of FIGS. 3A and 3B); and (5) securing the cap 1400 to the socket member 1113.

In another embodiment, an inflated dunnage bag (not shown) comprising the valve assembly 1000 (shown in FIG. 1) may be deflated by: (1) removing the cap 1400 (e.g., transitioning from the configuration of the valve assembly 1000 depicted in FIG. 1 to the configuration of the assembly 1000 depicted in FIGS. 3A and 3B); (2) operating the lever 1300 over its fulcrum on the support bar 1200 from its first position to its second position whereby the flapper 1200 bends along a center line under the force of the arms 1310 of the lever 1300 (transitioning from the configurations of FIGS. 3A and 3B to the configurations of FIGS. 3C and 3D); (3) allowing air to escape through the first and second sides 1130, 1143 of the tubiform body 1100 pressurized air or compressed air into the interior of the inflatable bladder, via the first and second sides 1130, 1140 of the tubiform body 1100, so as to deflate the bladder to up to zero capacity; (4) operating the lever 1300 over its fulcrum on the support bar 1200 from its second position to its first position. In another mode of deflating a dunnage bag, air may be drawn out of the bag by suction while the flapper 1200 is folded open by the arms.

It should be noted that the above description and recited embodiments or examples are of illustrative importance only. In other words, the descriptions of the present disclosure should not be construed as limiting of the subject matter in this application. Additional modifications may become apparent to one skilled in the art after reading this disclosure. For instance, the valve assembly is disclosed in connection with dunnage bags, but the valve assembly may be equally operable in any manner or on any type of airbags.

I claim:

1. A valve assembly comprising:
   a tubiform body;
   a support bar that is disposed across the inside the tubiform body, so as to divide the tubiform body into two sides;
   a flapper for closing the two sides of the tubiform body, said flapper being coupled to the support bar along a midsection of the flapper;
   a lever with two arms and a fulcrum between the two arms, wherein said lever is pivotally mounted to the support bar so that said two arms operate over the fulcrum to fold the flapper between the two arms and along said midsection so that the tubiform body is open on both of said two sides.

2. An airbag comprising:
an inflatable bladder; and,
a valve assembly comprising
    a tubiform body having a flange and a socket member, wherein the flange is disposed around said body and is coupled to an aperture in the inflatable bladder so that a socket member of the tubiform body is positioned externally of the bladder and so that the tubiform body provides fluid communication from the socket member to the inside of the bladder,
    an internal support bar,
    a flapper coupled to the support bar along the midsection of the flapper, wherein the flapper closes the fluid communication from the socket member to the inside of the bladder, and
    a lever with a fulcrum on the support bar, wherein operating of the lever on the fulcrum causes said lever to pivot about said fulcrum so that the flapper bends along said midsection for opening the fluid communication from the socket member to the inside of the bladder.

3. The air bag of claim 2 wherein the internal support bar is disposed between the flange and socket member.

4. The air bag of claim 3 wherein the internal support bar is disposed across the tubiform body so as to divide the tubiform body into two sides.

5. The air bag of claim 4 wherein the lever is defined by at least one arm, wherein operating of the lever on the fulcrum causes the arm to contact the flapper.

6. A method of deflating an airbag comprising the step of:
locating a valve assembly on the airbag;
identifying a flapper that is disposed on a support bar within the value assembly and that is stopping fluid communication through the valve assembly;
pivoting a lever about a fulcrum on the support bar to fold a said flapper between two arms of the lever so that said fluid communication through the valve assembly is established.

7. The method of claim 6 wherein:
the flapper is mounted to the support bar along a midsection thereof the flapper; and,
pivoting the lever moves the two arms so that the arms fold the flapper along said midsection of the flapper.

8. The air bag of claim 6 wherein the lever is defined by two arms and wherein operating of the lever on the fulcrum causes the flapper to bend between said two arms.

* * * * *